F. O. SEYMOUR.
MACHINE FOR SETTING PLANTS.
APPLICATION FILED JUNE 30, 1915.

1,171,263.

Patented Feb. 8, 1916.
2 SHEETS—SHEET 1.

Witness
Stuart Hilder.

Inventor
Francis O. Seymour
E. W. Anderson Jr.
his Attorneys

F. O. SEYMOUR.
MACHINE FOR SETTING PLANTS.
APPLICATION FILED JUNE 30, 1915.

1,171,263.

Patented Feb. 8, 1916.
2 SHEETS—SHEET 2.

Witness
Stuart Hilder.

Inventor
Francis O. Seymour
By E. W. Anderson
Attorneys

UNITED STATES PATENT OFFICE.

FRANCIS O. SEYMOUR, OF KEOKUK, IOWA.

MACHINE FOR SETTING PLANTS.

1,171,263.  Specification of Letters Patent.  Patented Feb. 8, 1916.

Application filed June 30, 1915. Serial No. 37,230.

*To all whom it may concern:*

Be it known that I, FRANCIS O. SEYMOUR, a citizen of the United States, resident of Keokuk, in the county of Lee and State of Iowa, have made a certain new and useful Invention in Machines for Setting Plants; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
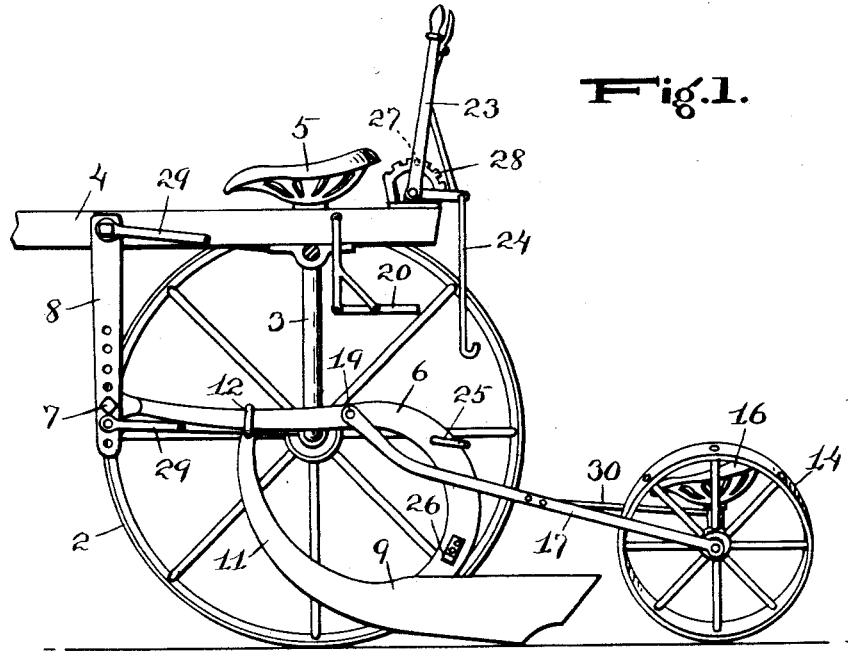
Figure 3:
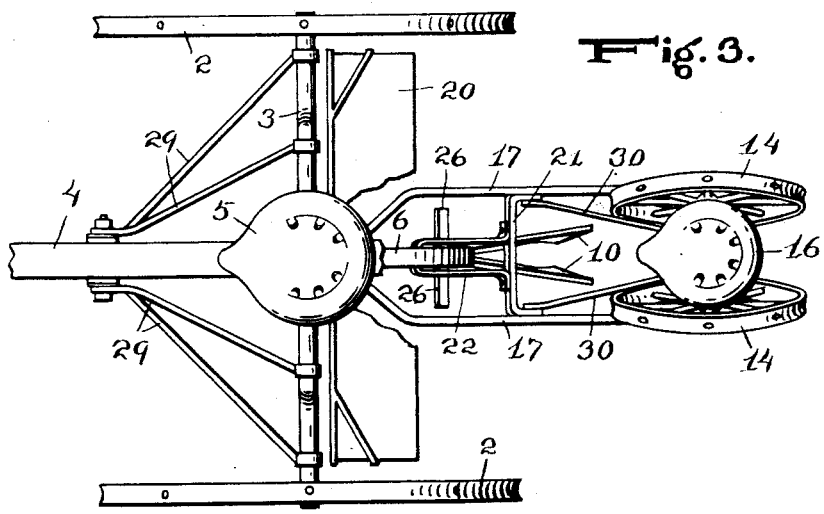
Figure 2:
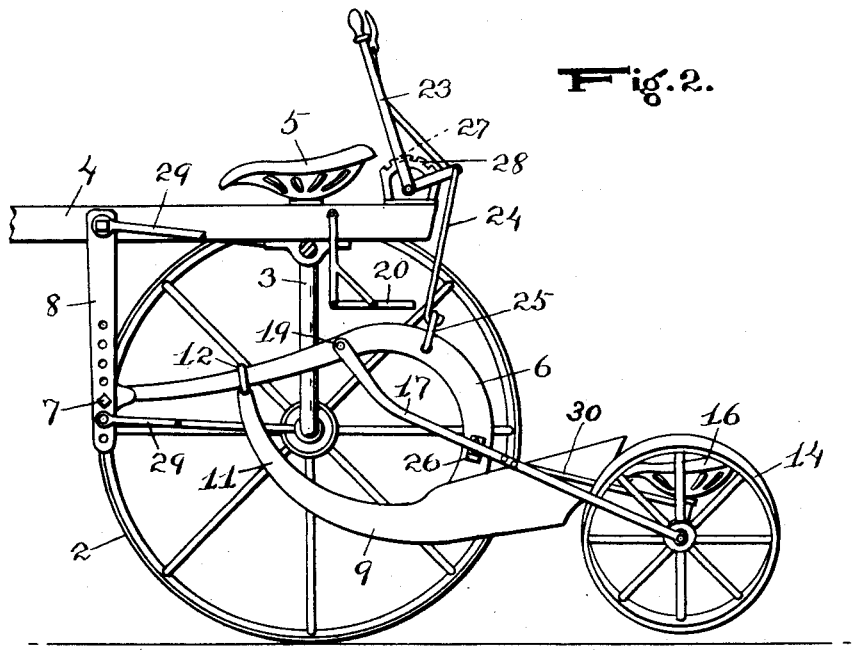
Figure 4:
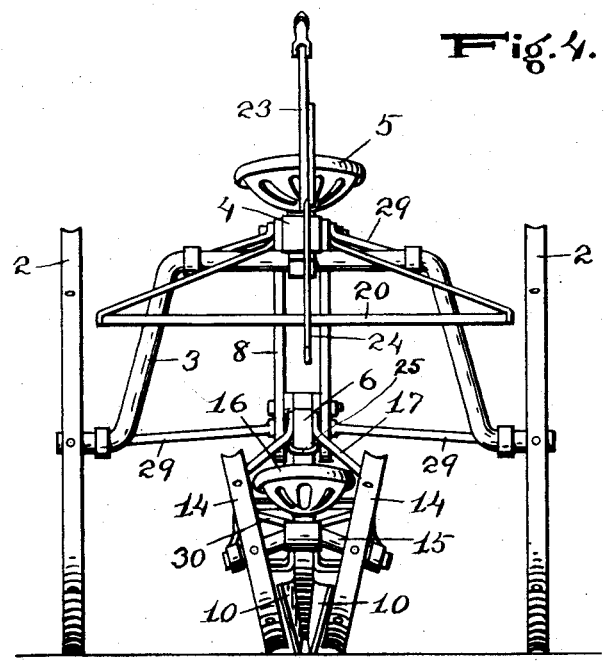

Figure 1 is a side view of the invention. Fig. 2 is a view similar to Fig. 1 with the shoe raised. Fig. 3 is a plan view of the same. Fig. 4 is a rear view of the invention.

The invention has relation to machines for setting out plants, as tomatoes, corn, potatoes and the like, having for its object to provide an improved machine, that will make the furrow and cover the plants in one operation.

The invention consists in the novel construction and combinations of parts, as hereinafter set forth.

In the accompany drawings, illustrating the invention, the numeral 2 designates two carrying wheels, 3 a reversed-U-form axle connecting the same, 4 a draft pole connected to said axle, and 5 a seat for the driver, mounted upon said draft pole.

6 is a rearwardly extending curved beam, having at its forward end a pivotal connection 7 with the lower end of a link 8, suspended from the draft pole, and 9 is the shoe, having lateral furrow-opening wings 10, 10, between which is received and secured the lower end of the beam, and a forward and upward extending curved portion 11, provided with a tapering forward edge, to facilitate entrance into the soil, the upper end of the portion 11 of said shoe being secured intermediately of the length of the beam at 12, forming a strong, well braced structure.

The coverer device consists preferably of a pair of inclined wheels 14, 14, mounted upon the branches of a bent axle 15, a seat 16 for a boy or attendant being mounted upon said bent axle, and the wheels being attached to the beam by means of lateral rods or links 17, pivotally connected to the beam at 19, midway of the rear end of the beam and the connection 12 between the beam and the upper end of the shoe.

A shelf for the plants is shown at 20, being connected with the draft pole by suitable braces.

In operation, the driver or operator attends to the team and the boy or helper removes the plants one by one from their shelf and places them successively between the wings of the shoe as the furrow is opened thereby, the plants being automatically covered by the inclined wheels, acting to centrally gather the soil thrown aside by the shoe, the weight of the helper being a material factor.

In rough ground, an independent rocking or pivotal movement is allowed the shoe and the coverer wheels, these parts being kept in line by cross-bar 21, connecting the lateral draft rods or links of the said wheels, and a forward extending loop 22 upon said cross-bar, loosely embracing the beam.

When the device is being transported from place to place, the shoe and coverer wheels are raised into inoperative position by a hand-lever 23, having a detachable link connection 24 with a loop 25 of the beam, which is first raised, laterally extending foot-rests 26 of the beam, for the helper, in the upward movement of the beam, engaging the forward extending loop of the centering means and next raising the lateral draft rods and the coverer wheels, the parts being held in raised position by a pawl device 27 of the lever, engaging a rack 28.

The depth of furrow is regulated by lengthwise adjustment of the pivot rod for the forward end of the beam, in any one of a series of perforations of the link.

The main axle is provided with suitable braces 29, 29, and the bent axle of the coverer wheels is also suitably braced at 30, 30.

In the use of this invention, one man and a boy are enabled to plant in one day as much as six men can plant without the aid of the machine.

What I claim is:

1. A machine for setting out plants, including carrying wheels, an axle connecting the same, a draft pole mounted upon said axle, a seat for the driver, a rearwardly extending beam having at its forward end a pivotal connection with said draft pole, a furrow-opening shoe at the lower end of said beam, inclined coverer wheels having lateral draft rods provided at their forward ends with a pivotal connection with said beam, a seat for a helper upon the axle of said inclined wheels, and means for alining said shoe and the coverer wheels.

2. A machine for setting out plants, including carrying wheels, a reversed-U-form axle connecting the same, a draft pole upon said axle, a seat for the driver, a link suspended from said pole, a rearwardly extending beam having at its forward end a pivotal connection with the lower end of said link, a furrow-opening shoe at the lower end of said beam, said shoe having a forward upward extending portion secured to the intermediate portion of said beam, inclined coverer wheels having lateral draft rods provided at their forward ends with a pivotal connection with said beam, a seat for a helper upon the axle of said inclined wheels, and means for alining said shoe and the coverer wheels.

In testimony whereof I affix my signature, in presence of two witnesses:

FRANCIS O. SEYMOUR.

Witnesses:
W. I. ROBERTS,
LAURA KELLEY.